May 24, 1966 — T. E. H. BECK ETAL — 3,252,687

ROTOR BLADE LOCKING

Filed Feb. 1, 1965

INVENTORS
Timothy E. H. Beck &
BY Charles E. Banks

Paul Fitzpatrick
ATTORNEY

United States Patent Office 3,252,687
Patented May 24, 1966

3,252,687
ROTOR BLADE LOCKING
Timothy Egerton Herbert Beck and Charles Emerson Banks, Indianapolis, Ind., assignors to General Motors Corporation, Detroit, Mich., a corporation of Delaware
Filed Feb. 1, 1965, Ser. No. 429,498
6 Claims. (Cl. 253—77)

This invention relates generally to a rotor blade lock and more specifically to a rotor blade lock for a rotor comprising a plurality of individually mounted blades secured in a circumferential groove in a rotor.

It is well-known in the art to assemble blades to a rotor by inserting them radially into a loading slot and sliding them circumferentially along a dovetail groove in the periphery of the rotor in order to secure the blades thereto. This type of blade attachment, however, creates the problem of devising some means to block the loading slot to prevent the blades from coming out. Previously used ways of doing this have included filling the loading slot with plastic thermosetting material, securing a member disposed in the loading slot to the rotor in some fashion, and spanning the loading slot with two blades with each blade having half of its root retained by the groove and half disposed in the loading slot. In this last solution some means for preventing circumferential movement of the blades must also be included.

The object of this invention is to provide a means for closing the loading slot in a circumferential dovetail mounting groove which is simpler and less complicated than any of the devices now available.

Another object is to provide a device disposed in a circumferential mounting groove which spans a loading slot therefor and which is prevented from moving circumferentially therein in a simple and unique manner.

The exact nature of this invention as well as other objects and advantages thereof will be readily apparent from consideration of the following specification relating to the annexed drawings in which.

Figure 1:
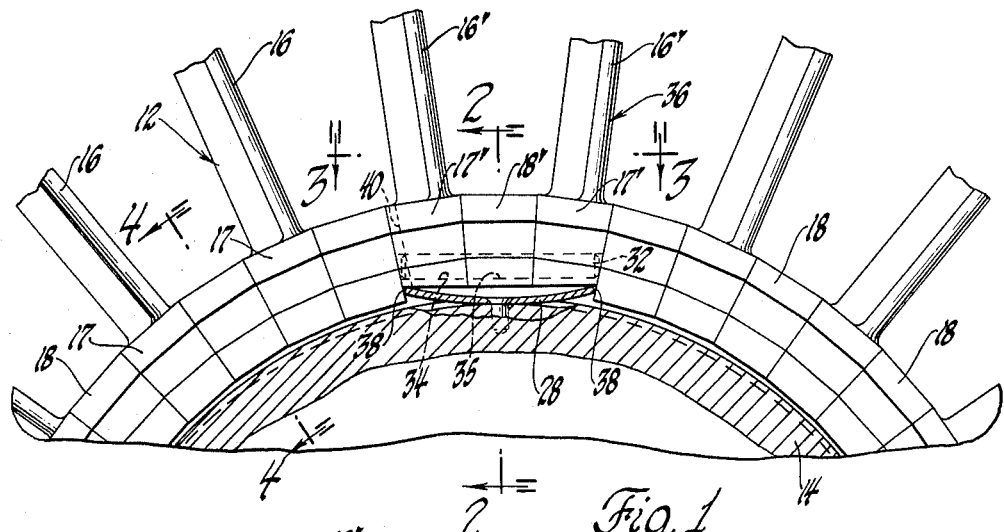
FIGURE 1 is a transverse section of a portion of a bladed rotor embodying a blade lock in accordance with the present invention.
Figure 2:
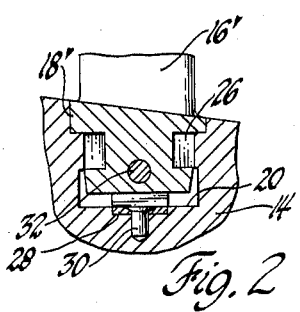
FIGURE 2 is a cross-section through the blade lock taken substantially along the line 2—2 of FIGURE 1 looking in the direction of the arrows.
Figure 3:
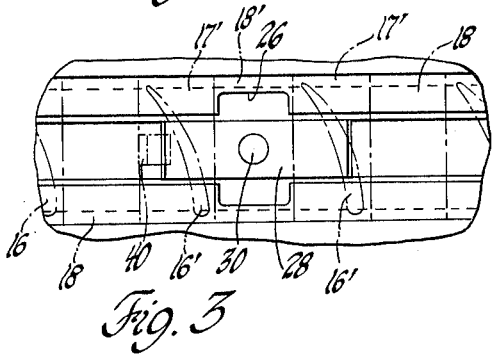
FIGURE 3 is a section taken substantially along the line 3—3 of FIGURE 1 looking in the direction of the arrows with the blades and spacers shown in phantom to more clearly illustrate the loading slot.
Figure 4:
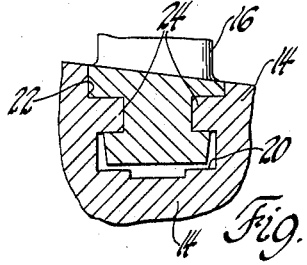
FIGURE 4 is a cross-section through a blade taken substantially along the line 4—4 of FIGURE 1 looking in the direction of the arrows.

Referring now to FIGURE 1, there is shown a portion of a bladed rotor indicated generally at 12. The bladed rotor 12 comprises a disc-shaped support member 14 which carries a plurality of alternated blades 16 and spacers 18. The blades 16 have dovetail roots 17 while the spacers 18 are themselves in the shape of the dovetail roots 17. The disc-shaped support member 14 has a circumferential groove 20 with lateral walls 22 provided with annular tongues 24 to give the groove 20 a mating dovetail cross section. The groove 20 includes a loading slot 26 in which the space between the tongues 24 has been widened to accommodate the inner end of the dovetail blade roots 17 and spacers 18 as can be seen in FIGURE 2. The width of the loading slot 26 also corresponds to the width of the roots 17 of the blades 16 and spacers 18 so that they may be inserted radially into the loading slot 26 over a leaf spring 28 secured to the bottom of the groove 20 by rivet 30.

Figure 5:
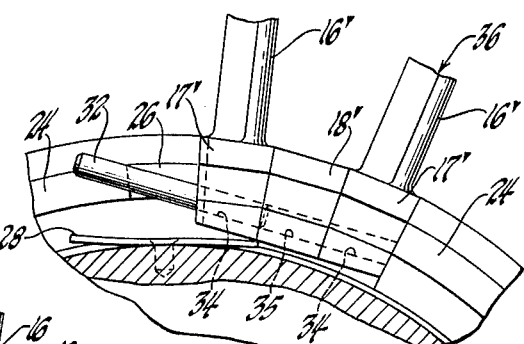
FIGURE 5 is a view of a portion of FIGURE 1 showing the assembly of a blade lock of the present invention within the circumferential retaining groove of the rotor.

In assembling the bladed rotor 12, the two blades 16′ having modified roots and an intermediate spacer 18′ are first individually inserted into loading slot 26, slideably mounted on tongues 24, and rotated a slight amount to the position shown in FIGURE 5. A locking pin 32 is then inserted in the aligned bores 34 and 35 in blade roots 17′ and spacers 18′ respectively to connect the blades 16′ and immediate spacer 18′ to form a blade lock 36.

Figure 6:
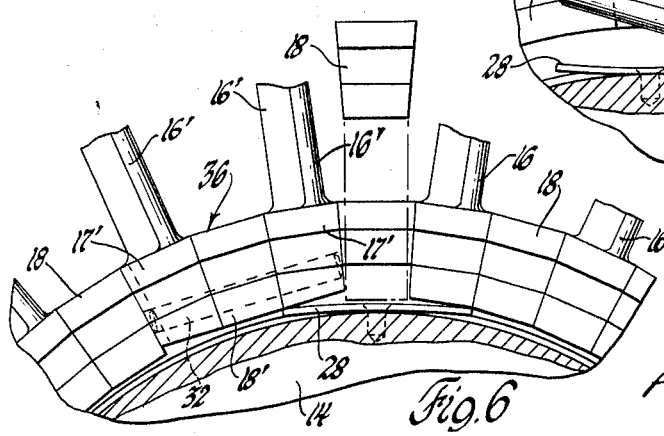
FIGURE 6 is a view of a portion of FIGURE 1 with the assembled blade lock in its position as the last spacer is inserted into the loading slot and just previously to rotation of the blade lock to its final position shown in FIGURE 1.

The members of the blade lock 36 thus connected are then rotated out of the path of the loading slot 26 to the position shown in FIGURE 6. Blades 16 and spacers 18 are then alternately inserted into the loading slot 26 and circumferentially moved about the disc 14 until the groove 20 is filled. FIGURE 6 shows the rotor with the last spacer 18 being inserted into the loading slot 26. After this last spacer 18 has been inserted, blades 16, spacers 18 and blade lock 36 are rotated until blade lock 36 occupies the position shown in FIGURE 1. When blade lock 36 reaches this position, the ends of leaf spring 28 springs outwardly resiliently contacting the inner ends of the blades 16′ and abutting shoulders 38 which are present because the roots on the blade lock are shallower than the spacers 18 on either side of the blade lock 36. The spring 28 in this position prevents relative rotation between the blades and spacers and the disc support 14 in either direction. The loading slot is now spanned by the blade lock 36 and blocked. Withdrawal of the spacer 18′ through the loading slot 26 is prevented because it is connected to the adjacent blades 16′, by lock pin 32.

In order to disassemble the bladed rotor, the left hand blade 16′ has a radial groove 40 extending from the outer surface to the inner surface of its root 17′. A thin instrument (not shown) is inserted into groove 40 depressing the left end of spring 28 out of abutment with shoulder 38. The blades and spacers may now be rotated moving blade lock 36 to the position of FIGURE 5 where loading slot 26 is unblocked. The blades and spacers may now individually be withdrawn radially through slot 26 and the blade lock 36 subsequently disassembled in the groove 20 and withdrawn through loading slot 26. Should it be necessary to merely replace a blade or spacer, the blades and spacers are rotated until the particular blade or spacer is aligned with the loading slot. This element is then replaced and the blades and spacers are rotated until blade lock again assumes the position of FIGURE 1 where leaf spring 28 abuts shoulders 38.

Of course, the disassembly groove 40 may be provided in either of the end elements of the blade lock 36. Equally obvious is the fact that the subject blade lock may be utilized in the type of rotor assembly in which no spacers are utilized between the blades. In this case, the blade lock 36 would comprise two or more blades with pin 32 being inserted through their roots.

Thus it can be seen that I have invented a simple device for closing the loading slot in a circumferential mounting groove which is simple and uncomplicated.

Obviously many modifications and variations are possible in light of the above teaching. It should be therefore understood that the foregoing disclosure relates only to a preferred embodiment of the invention and that it is intended to cover all modifications and variations within the spirit and scope of the invention defined in the appended claims.

We claim:

1. A bladed member comprising:
    an annular support member,
    a dovetail circumferential groove in the periphery of said support, said circumferential groove including a loading slot,
    a plurality of blades having roots adapted to be inserted radially into said loading slot slideably retained in said groove,
    a plurality of spacers having roots adapted to be inserted radially into said loading slot slideably retained in said groove and alternated with said blades,
    a blade lock sliedably retained in said groove and spanning said loading slot, said blade lock including two of said blades and an intermediate spacer,
    the roots of said two blades and spacer being shallower than the remaining roots to form shoulders with the roots on either side of said blade lock, said shallower roots having aligned transverse bores,
    a lock pin disposed in said bores to span said blade lock, and
    a leaf spring secured in said loading slot inwardly of said blade lock, said leaf spring being coextensive with said blade lock and abutting said shoulders formed by said adjacent roots to prevent circumferential movement of said plurality of blades and spacers within said groove whereby said loading slot is blocked by said blade lock to prevent said blades and spacers from being withdrawn radially therethrough.

2. A bladed member comprising:
    an annular support member,
    a dovetail circumferential groove in the periphery of said support, said circumferential groove including a loading slot,
    a plurality of blades having roots adapted to be inserted radially into said loading slot slideably retained in said groove,
    a blade lock slideably retained in said groove and spanning said loading slot, said blade lock including at least two blades having roots which are shallower than the remaining roots to form shoulders with adjacent roots on either side of said blade lock, said shallower roots having aligned transverse bores,
    a lock pin disposed in said bores to span said blade lock, and
    a leaf spring secured in said loading slot inwardly of said blade lock, said leaf spring being coextensive with said blade lock and abutting said shoulders formed by said adjacent roots to prevent circumferential movement of said plurality of blades within said groove whereby said loading slot is blocked by said blade lock to prevent said blades from being withdrawn radially therethrough.

3. A bladed member comprising:
    an annular support member,
    a dovetail circumferential groove in the periphery of said support, said circumferential groove including a loading slot,
    a plurality of blades having roots adapted to be inserted radially into said loading slot slideably retained in said groove,
    a blade lock slideably retained in said groove and spanning said loading slot, said blade lock including at least two blades having roots which are shallower than the roots on either side of said blade lock to form shoulders therewith,
    means to connect said shallower roots, and
    a leaf spring secured in said loading slot inwardly of said blade lock, said leaf spring being coextensive with said blade lock and abutting said shoulders formed by said adjacent roots to prevent circumferential movement of said plurality of blades within said groove whereby said loading slot is blocked by said blade lock to prevent said blades from being radially withdrawn therethrough.

4. A bladed member comprising:
    an annular support member,
    a dovetail circumferential groove in the periphery of said support, said circumferential groove including a loading slot,
    a plurality of blades having roots adapted to be inserted radially into said loading slot slideably retained in said groove,
    a blade lock slideably retained in said groove and spanning said loading slot, said blade lock including at least two blades having roots which are shallower than the roots on either side of said blade lock to form shoulders therewith, said shallower roots having aligned transverse bores,
    a lock pin disposed in said bores to connect said shallower roots, and
    means secured in said loading slot inwardly of said blade lock to abut said shoulders formed by said adjacent roots and prevent circumferential movement of said plurality of blades within said groove whereby said loading slot is blocked by said blade lock to prevent said blades from being radially withdrawn therethrough.

5. A bladed member comprising,
    an annular support member,
    a dovetail circumferential groove in the periphery of said support,
    a plurality of blades having roots adapted to be slideably retained in said dovetail groove, said dovetail groove including a loading slot of sufficient circumferential width and axial length to receive said roots radially,
    a blade lock slideably retained in said groove, said blade lock including at least two roots so as to have a greater circumferential width than said loading slot, the blade roots of said blade lock having aligned transverse bores,
    a lock pin disposed in said bores to connect the roots included in said blade lock, and
    further means to positively locate said blade lock so that it spans said loading slot.

6. A bladed member comprising:
    an annular support member,
    a dovetail circumferential groove in the periphery of said support member, said circumferential groove including a loading slot,
    a plurality of blades having roots adapted to be inserted radially into said loading slot slideably retained in said groove,
    a blade lock slideably retained in said groove and circumferentially spanning said loading slot, said blade lock including two blades having roots which are shallower than the roots on either side of said blade lock to form shoulders therewith, and
    means secured in said loading slot inwardly of said blade lock to abut said shoulders formed by said adjacent roots and prevent circumferential movement of said plurality of blades within said groove whereby said loading slot is blocked by said blade lock to prevent said blades from being radially withdrawn therethrough.

References Cited by the Examiner

UNITED STATES PATENTS

| | | | |
|---|---|---|---|
| 775,108 | 11/1904 | Elliott | 253—77 |
| 943,348 | 12/1909 | Hodgkinson | 253—77 |
| 1,062,737 | 5/1913 | Richter | 253—77 |
| 3,053,504 | 9/1962 | Shelley | 253—77 |
| 3,076,633 | 2/1963 | Bridle et al. | 253—77 |

FOREIGN PATENTS

| | | |
|---|---|---|
| 1,085,643 | 7/1960 | Germany. |
| 827,264 | 2/1960 | Great Britain. |
| 124,821 | 3/1928 | Switzerland. |
| 341,511 | 11/1959 | Switzerland. |

SAMUEL LEVINE, *Primary Examiner.*

E. A. POWELL, Jr., *Assistant Examiner.*